United States Patent
Arora et al.

(10) Patent No.: US 11,941,622 B2
(45) Date of Patent: Mar. 26, 2024

(54) METHOD AND SYSTEM FOR EMPLOYING BLOCKCHAIN FOR FRAUD PREVENTION IN BULK PURCHASES

(71) Applicant: MASTERCARD INTERNATIONAL INCORPORATED, Purchase, NY (US)

(72) Inventors: Ankur Arora, New Delhi (IN); Rakesh Patel, Haryana (IN); Anisha Garg, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 729 days.

(21) Appl. No.: 15/929,943

(22) Filed: May 29, 2020

(65) Prior Publication Data

US 2021/0374729 A1    Dec. 2, 2021

(51) Int. Cl.
*G06Q 20/38* (2012.01)
*G06Q 20/40* (2012.01)
*H04L 9/06* (2006.01)

(52) U.S. Cl.
CPC ......... *G06Q 20/389* (2013.01); *G06Q 20/388* (2013.01); *G06Q 20/4016* (2013.01); *H04L 9/0637* (2013.01)

(58) Field of Classification Search
CPC ......... G06Q 20/20; G06Q 20/36; G06Q 20/38
See application file for complete search history.

(56) References Cited

U.S. PATENT DOCUMENTS

| | | | | |
|---|---|---|---|---|
| 2014/0019352 | A1* | 1/2014 | Shrivastava | G06Q 20/326 705/41 |
| 2017/0236121 | A1* | 8/2017 | Lyons | G06Q 20/06 705/71 |
| 2019/0220856 | A1* | 7/2019 | Li | G06Q 20/065 |
| 2020/0167769 | A1* | 5/2020 | Green | G06Q 20/3825 |
| 2021/0374729 | A1* | 12/2021 | Arora | G06Q 20/02 |

* cited by examiner

*Primary Examiner* — Patrick McAtee
*Assistant Examiner* — Nakia Leffall-Allen
(74) *Attorney, Agent, or Firm* — Panitch Schwarze Belisario Nadel LLP

(57) ABSTRACT

A method for preventing unauthorized repeat purchases of a product includes: storing a plurality of purchase data values, each related to a completed financial transaction and including a purchase identifier; receiving an authorization request for a new financial transaction from an external system, the authorization request including a specific identifier; identifying a number of purchase data values where the included purchase identifier matches the specific identifier; and transmitting an authorization response to the external system, the authorization response including (i) an approval of the new financial transaction if the number of purchase data values is below a predetermined number, or (ii) a denial of the new financial transaction if the number of purchase data values is equal to or above the predetermined number.

16 Claims, 5 Drawing Sheets

METHOD AND SYSTEM FOR EMPLOYING BLOCKCHAIN FOR FRAUD PREVENTION IN BULK PURCHASES

FIELD

The present disclosure relates to the use of blockchain for fraud prevention in bulk purchases, specifically preventing repeated purchases of a product where discounts may be available for new customers to prevent unauthorized buying in bulk and thus negating the reasons for the offered discount.

BACKGROUND

Merchants are reliant on their customers to keep them in business. While every merchant can appreciate repeat customers that will continually give the merchant business, merchants often have to focus on ways to obtain new customers. Traditionally, merchants have utilized advertising to reach out to new customers, such as through mailers, magazine or newspaper advertisements, television or radio commercials, etc. The goal is often to have new customers enticed to visit the merchant, with the hope that the customer will be so impressed by the merchant, their selection, their prices, etc., that the customer will return and become a repeat customer.

In some cases, merchants may offer new customers a special discount when visiting the merchant for the first time. In many instances, the discount may be significant, where the merchant may take a loss on an expensive good or service, with the hope that the loss will be outweighed by the eventual profit gained from the customer for repeat business. In other words, the customer is offered a discount that is too good to pass up, so that the customer will keep coming back to the merchant and eventually the merchant has made a profit on that customer.

However, some nefarious parties have sought to take advantage of such offers and discounts. These nefarious actors will buy an expensive product from a first merchant with a new customer discount, buy the expensive product from a second merchant with a new customer discount, and so on. As the nefarious actor buys expensive products at the large discounts, they will turn around and re-sell the product to others at a significantly higher, such as at or close to retail, price. Thus, the merchant has sold the product at a large discount to a customer strictly to hope that the customer will be a repeat customer when, in actuality, the customer had no intention of returning to the merchant, but was instead taking advantage of the merchant's discount and their own position.

However, merchants currently have very little ability to identify when such purchases may be occurring. A merchant often keeps a history of their own transactions, and could identify if a nefarious actor is pretending to be a first-time customer if they re-use a credit card, name, or other data used in a prior purchase. On the other hand, if the customer uses data or a payment instrument that the merchant has not seen before, the merchant has no way of knowing if the customer is a genuine new customer, or has been taking advantage of first-time discounts at fellow merchants. Thus, there is a need for a system where a merchant can be protected when providing discounts for first-time customers.

SUMMARY

The present disclosure provides a description of systems and methods for preventing unauthorized repeat purchases of a product. A database of purchases for a product is kept, which tracks purchases of the product at a plurality of different merchants through payment instruments as well as other data captured for the purchases, such as name, e-mail address, telephone number, mailing address, etc. Any time an individual wants to purchase the product while taking advantage of a first-time customer discount, their information is provided to the system, which will check the information against the database of purchases. The more past purchases that are related to the new purchase, the more likely it is that the customer is taking advantage of the merchant. If the number of related past purchases meets a predetermined number, which may be provided by the merchant, then the discounted transaction is denied, preventing the customer from taking advantage. The system looks at related transactions through every possible metric, so that any repeat information across any merchant may indicate a relationship (e.g., using different credit cards at four merchants may still be related if the same telephone number is used, or vice versa). The result is that it may be exceedingly difficult for a nefarious actor to take advantage of the first-time customer discounts. Thus, any customer taking advantage of a first-time customer discount that is not denied by the system may be a genuine first-time customer where the merchant has a possibility of earning their repeat business.

A method for preventing unauthorized repeat purchases of a product includes: storing, in a memory of a processing server, a plurality of purchase data values, each purchase data value being related to a completed financial transaction and including at least a purchase identifier; receiving, by a receiver of the processing server, an authorization request for a new financial transaction from an external system, the authorization request including at least a specific identifier; executing, by a processing device of the processing server, a first query on the memory of the processing server to identify a number of purchase data values where the included purchase identifier matches the specific identifier; and transmitting, by a transmitter of the processing server, an authorization response to the external system, the authorization response including (i) an approval of the new financial transaction if the number of purchase data values is below a predetermined number, or (ii) a denial of the new financial transaction if the number of purchase data values is equal to or above the predetermined number.

A system for preventing unauthorized repeat purchases of a product includes: a memory of a processing server storing a plurality of purchase data values, each purchase data value being related to a completed financial transaction and including at least a purchase identifier; a receiver of the processing server receiving an authorization request for a new financial transaction from an external system, the authorization request including at least a specific identifier; a processing device of the processing server executing a first query on the memory of the processing server to identify a number of purchase data values where the included purchase identifier matches the specific identifier; and a transmitter of the processing server transmitting an authorization response to the external system, the authorization response including (i) an approval of the new financial transaction if the number of purchase data values is below a predetermined number, or (ii) a denial of the new financial transaction if the number of purchase data values is equal to or above the predetermined number.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
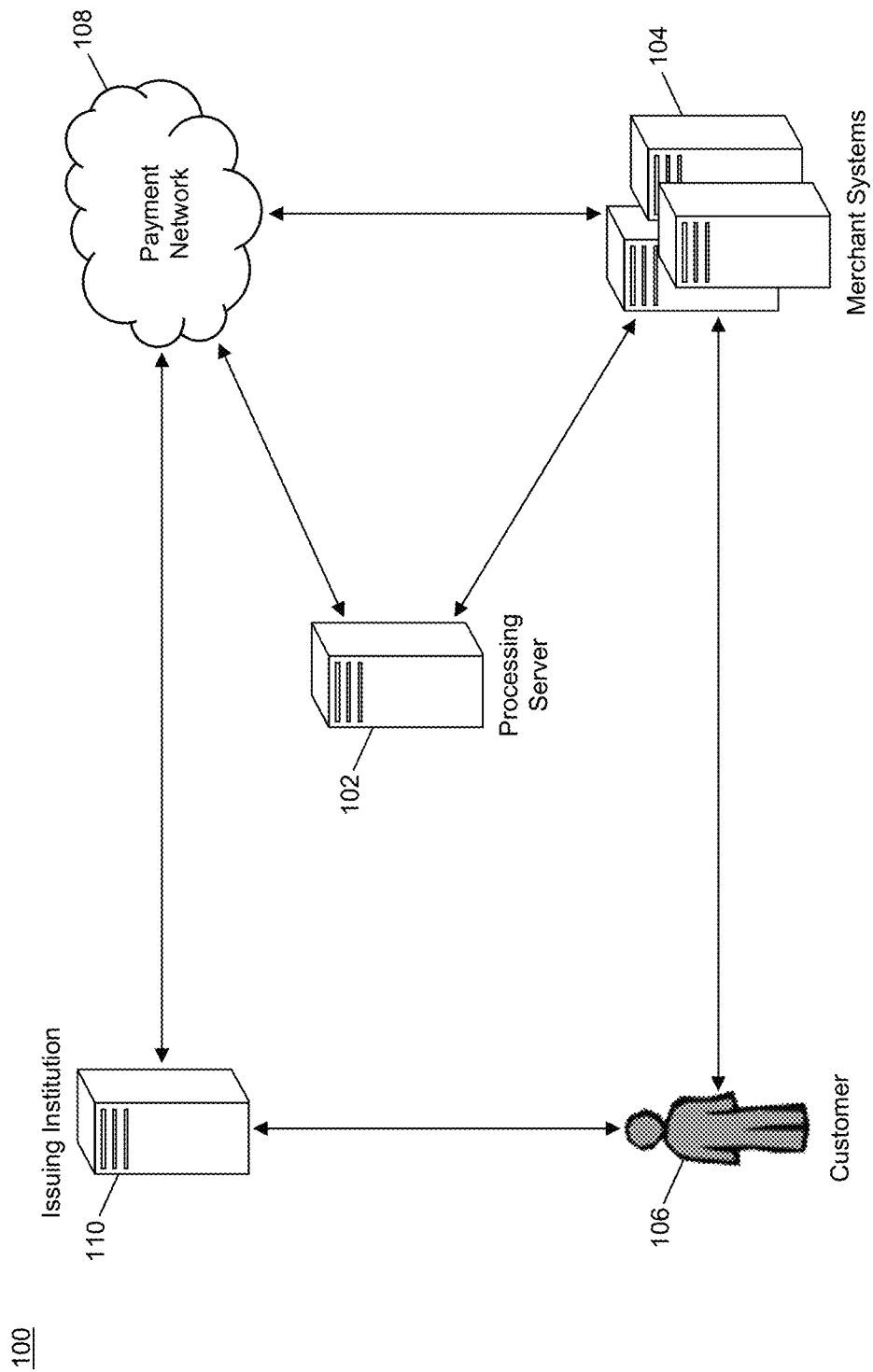
FIG. 1 is a block diagram illustrating a high level system architecture for the prevention of unauthorized repeat purchases in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Prevention of Unauthorized Repeat Purchases

FIG. 1 illustrates a system 100 for the prevention of unauthorized repeat purchases across a plurality of different merchants, to prevent a nefarious actor from taking advantage of limited discounts.

The system 100 may include a processing server 102. The processing server 102, discussed in more detail below, may be configured to identify when a new payment transaction is related to past purchases for the same or a similar product, in order to prevent someone from obtaining a discount for a product when unintended. For example, merchants may offer a significant discount for a first-time customer to entice the customer to visit the merchant and then, ideally, become a repeat customer for that merchant. The processing server 102 may identify cases where a customer may pretend to be a first-time customer for the discount, while doing so at multiple merchants with no intention of becoming a repeat customer.

In the system 100, a plurality of merchant systems 104 may participate in tracking consumer purchases for a specific product or series of products. As discussed herein, transactions may be tracked for a single product (e.g., a specific make a model of a product, any product having the same universal product code, etc.) or for a product and any product related thereto (e.g., different models of the same product, products related by type or brand, etc.). For example, the processing server 102 may track all purchases of a very specific smart phone, of all smart phones of the same brand, of all smart phones of different brands of a similar generation, or of all smart phones generally. In the system 100, any time a purchase is made for one of these products with a merchant system 104, the merchant system 104 may provide information related thereto to the processing server 102, or to another entity where the information may be made available to the processing server 102.

Information related to a purchase of one of these products may include at least a primary account number or other payment credential related to the payment instrument or method used to purchase the product, or any other identifying information obtained by the merchant system 104 during the purchase. As discussed herein, this type of data may be referred to as "purchase identifiers." Purchase identifiers may include, for example, a primary account number, mailing address, e-mail address, name, telephone number, username, device identifier, electronic wallet identifier, public key, etc. The data may be stored as a plurality of purchase data values in the processing server 102 or in one or more external systems that are accessible by the processing server 102. Each purchase data value may be related to a purchase of one of the products and include the information obtained for the purchase including any associated purchase identifier. In some embodiments, purchase data values may be stored in a local database of the processing server 102.

In some cases, purchase data values may be stored in a blockchain. The blockchain may be stored, managed, and maintained directly by the processing server 102, or may be operated using a plurality of different computing systems, which may include the processing server 102, as part of a blockchain network. A blockchain network may be comprised of a plurality of blockchain nodes. Each blockchain node, which may include the processing server 102, may be a specially configured computing system that is configured to perform functions related to the processing and management of the blockchain, including the generation of blockchain data values, confirmation of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the blockchain network prior to the generation and addition of a new block to the blockchain in order for the change to be made permanent. Computational and communication limitations may make such a modification exceedingly difficult, if not impossible, thus rendering the blockchain immutable.

In these embodiments, a blockchain data value may be a purchase data value, and thus be related to a purchase of the product and include any purchase identifiers received for that purchase from a merchant system 104. In some cases, each merchant system 104 may be a node in the blockchain network and may submit new blockchain data values and/or blocks including new blockchain data values for transactions involving the merchant system 104 to the blockchain network.

In some cases, the processing server 102 (e.g., or blockchain network or other storage system) may store purchase data values for a plurality of different types of products. In such cases, product identifiers may be used to identify purchase data values for related purchases. For example, the processing server 102 may track for first-time discounts for smart phones as well as for jewelry purchases, where product identifiers may be used to differentiate which product is involved in a proposed payment transaction.

In the system 100, a customer 106 may approach one of the merchant systems 104 to purchase the product (e.g., or one of the products included in a group of similar products) with a first-time customer discount. The merchant system 104 may collect one or more purchase identifiers from the customer 106 as part of the purchasing process. The merchant system 104 may then submit the information to the processing server 102 using a suitable communication network and method. The processing server 102 may receive the purchase identifier(s) provided by the customer 106, as transmitted by the merchant system 104. The processing server 102 may then identify any stored purchase data value (e.g., in local storage, cloud storage, blockchain, etc.) that includes any of the received purchase identifiers. In some cases, if one or more purchase data values are identified that includes multiple purchase identifiers, where some of the purchase identifiers do not match any provided by the merchant system 104, then the processing server 102 may perform another identification using those additional purchase identifiers. For example, the merchant system 104 may provide a primary account number (PAN) and an e-mail address supplied by the customer 106. The processing server 102 may identify two purchase data values that have the same PAN, where the first has the same e-mail address and the second has a different e-mail address. The processing server 102 may then identify additional purchase data values that include the different e-mail address, which may have different PANs or other purchase identifiers. The processing server 102 may continue to repeat the process for all purchase identifiers, which may reveal any related purchases where the same customer 106 attempted to purchase the same product, but changing up the information given to the respective merchant system 104.

Once the processing server 102 has identified every related purchase data value, the processing server 102 may determine if the transaction should be approved for the first-time discount or denied. The determination may be based on if the number of identified purchase data values is below a predetermined number or meets or exceeds the predetermined number. The predetermined number may be set by the merchant system 104 that submits the new transaction information (e.g., included in the submission or previously registered by the merchant system 104), may be specific to the product whose purchase is being attempted (e.g., set by the merchant systems 104, a product manufacturer, or other suitable entity), or may be set by the processing server 102. For example, the predetermined number may be four for one product and eight for another, or one merchant system 104 may set their number to be four while another merchant system 104 may use six.

The processing server 102 may electronically transmit their determination of approval or denial back to the merchant system 104 based on the comparison to the predetermine number. In some cases, the processing server 102 may provide their identified number of related purchase data values to the merchant system 104. In some instances, the processing server 102 may provide only the identified number, while the merchant system 104 may use that number to make a determination as to whether or not to allow the transaction to proceed with the first-time customer discount.

In some embodiments, the processing server 102 may make the determination as part of the processing of an electronic payment transaction for the product. In such embodiments, the merchant system 104 may submit an electronic payment transaction to a payment network 108 for processing, either directly from the merchant system 104 to the payment network 108 using payment rails associated therewith, or through one or more intermediate entities, such as an acquiring financial institution or a gateway processor. The payment network 108 may receive a transaction message for the payment transaction, which may be a specially formatted data message that is formatted pursuant to one or more standards governing the interchange of electronic transaction messages, such as the International Organization of Standardization's ISO 8583 or ISO 20022 standards. The transaction message may include a message type indicator indicating a type for the transaction message and a plurality of data elements, where each data element stores data as set forth in the applicable standard(s).

For example, the payment network 108 may receive an authorization request (e.g., as indicated in the message type indicator) from the merchant system 104 that includes data elements that store a primary account number, name, telephone number, and a product identifier, among other transaction data stored in the transaction message (e.g., transaction amount, currency type, merchant identifier, other payment credentials, transaction time and/or date, point of sale identifier, etc.). Traditionally, the payment network 108 may route the authorization request to an issuing institution 110, which may be a financial institution that issued a transaction account to the customer 106 that is being used to fund the electronic payment transaction. In such cases, the issuing institution 110 approves or denies the payment transaction and returns an authorization response (e.g., another transaction message that includes a data element that stores a response code indicating if the transaction is approved or denied) to the payment network 108 via the payment rails associated therewith, which is then forwarded to the merchant system 104 for finalizing of the payment transaction accordingly.

In the system 100, the payment network 108 may forward the authorization request to the processing server 102 using the payment rails associated therewith. In some cases, the payment network 108 may forward the authorization request to the processing server 102 before the issuing institution 110 has approved or denied the transaction. In other cases, the payment network 108 may forward the authorization request only in cases where the issuing institution 110 has already provided an authorization response indicating approval of the payment transaction. The processing server 102 may receive the authorization request and may identify related purchase data values using the data included in the data elements of the authorization request. In some instances, the processing server 102 may provide its approval or denial directly to the payment network 108 based on comparison of the number of identified purchase data values to the predetermined number. In other instances, the processing server 102 may generate an authorization response for the payment transaction indicating approval or denial based on the comparison, where the authorization response may be transmitted to the payment network 108 using the payment rails associated therewith. The authorization response may then be forwarded to the merchant system 104 for finalizing of the transaction (e.g., giving the customer 106 the product at the first-time customer discount if approved, or denying use of the first-time customer discount if denied). In cases where the processing server 102 is provided the authorization request before the issuing institution 110, the payment network 108 may forward the authorization request to the issuing institution 110 if the processing server 102 approves the transaction. If the processing server 102 denies the transaction, then the issuing institution 110 may never receive an authorization request in such cases, reducing overall network traffic.

The methods and systems discussed herein enable merchant systems 104 to safely offer first-time customer discounts to a customer 106 without worry that the customer 106 is a nefarious actor trying to take advantage of such discounts for bulk purchasing of a product for resale. By tracking various types of purchase identifiers for a plurality of different merchant systems 104, the processing server 102 can accurately determine if a customer 106 is a genuine first-time or new customer, or is attempting to take advantage of the merchant, even in cases where a customer 106 may switch up the information being provided to the merchant system 104. As a result, fraud can be more efficiently and effectively prevented in such purchases through use of the practical solution provided by the processing server 102.

Processing Server

Figure 2:
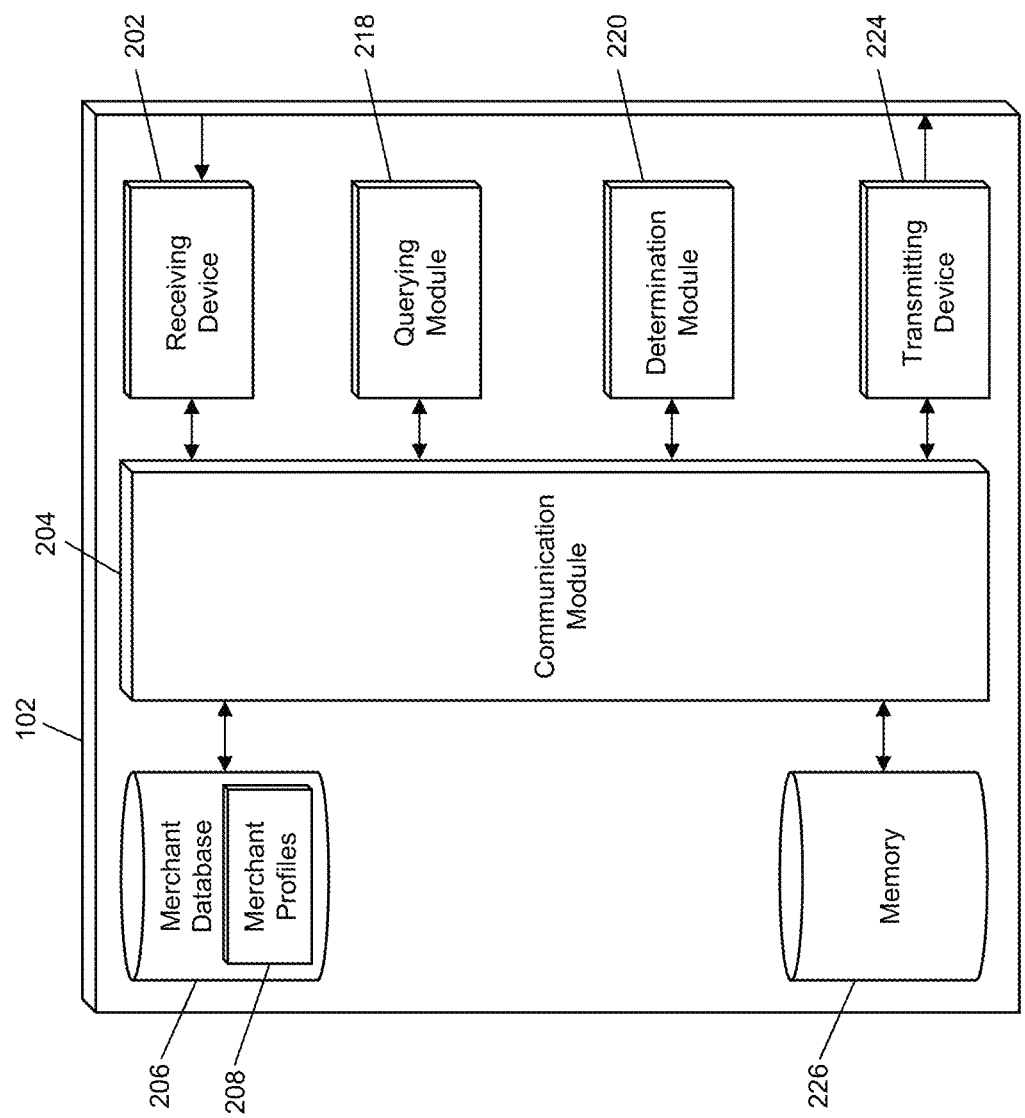
FIG. 2 is a block diagram illustrating the processing server of the system of FIG. 1 for the prevention of unauthorized repeat purchases of a product in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from merchant systems 104, payment networks 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by merchant systems 104 and payment networks 108 that are superimposed or otherwise encoded with transaction messages or other data messages that include transaction data for a processed or attempted payment transaction. The transaction data may include at least a product identifier and one or more purchase identifiers. In some cases, the transaction data may include a predetermined number for use in approving or denying a proposed electronic payment transaction. In embodiments where a blockchain may be used to store purchase data values, the receiving device 202 may be configured to receive blockchain data from nodes in a blockchain network.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, determination module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a merchant database 206. The merchant database 206 may be configured to store a plurality of merchant profiles 208 using a suitable data storage format and schema. The merchant database 206 may be a relational database that utilizes structured query language for the storage, identification, modifying, updating, accessing, etc. of structured data sets stored therein. Each merchant profile 208 may be a structured data set configured to store data related to a merchant system 104. A merchant profile 208 may include at least a merchant identifier and a predetermined number. The merchant identifier may be a merchant identification number (MID) or other value unique associated with the related merchant system 104 for use in identification thereof, such as may be included in authorization requests or other data messages. The predetermined number may be the number used to determine if a first-time discount should be approved for a proposed transaction based on past purchases related to the involved customer 106.

The processing server 102 may include a querying module 218. The querying module 218 may be configured to execute queries on databases to identify information. The querying module 218 may receive one or more data values or query strings, and may execute a query string based thereon on an indicated database, such as the merchant database 206 of the processing server 102 to identify information stored therein. The querying module 218 may then output the identified information to an appropriate engine or module of the processing server 102 as necessary. The querying module 218 may, for example, execute a query on a blockchain or other data storage of purchase data values to identify all purchase data values associated with a proposed payment transaction based on the purchase identifiers included therein.

The processing server 102 may also include a determination module 220. The determination module 220 may be configured to make determinations for the processing server 102 as part of the functions of the processing server 102 as discussed herein. The determination module 220 may receive instructions as input, may make a determination as instructed, and may output a result of the determination to another module or engine of the processing server 102. The determination module 220 may, for example, determine if a transaction should be approved or denied based on a number of identified purchase data values that are related thereto based on purchase identifiers as compared to a predetermined number, which may be included in a received authorization request or stored in a merchant profile 208 associated with the merchant system 104 involved in the attempted transaction.

The processing server 102 may also include a transmitting device 224. The transmitting device 224 may be configured to transmit data over one or more networks via one or more network protocols. In some instances, the transmitting device 224 may be configured to transmit data to merchant systems 104, payment networks 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to merchant systems 104 that are superimposed or otherwise encoded with determinations for approval or denial of an proposed payment transaction as determined by the determination module 220. The transmitting device 224 may also be configured to electronically transmit data signals to payment networks 108 or merchant systems 104 that are superimposed or otherwise encoded with authorization responses for electronic payment transaction, which may be formatted pursuant to one or more standards governing the interchange of electronic transaction messages.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, purchase data values, blockchain data, communication data for payment networks 108 and merchant systems 104, transaction message formatting standards, predetermined numbers, etc.

Process for Prevention of Unauthorized Repeat Purchases

Figure 3:
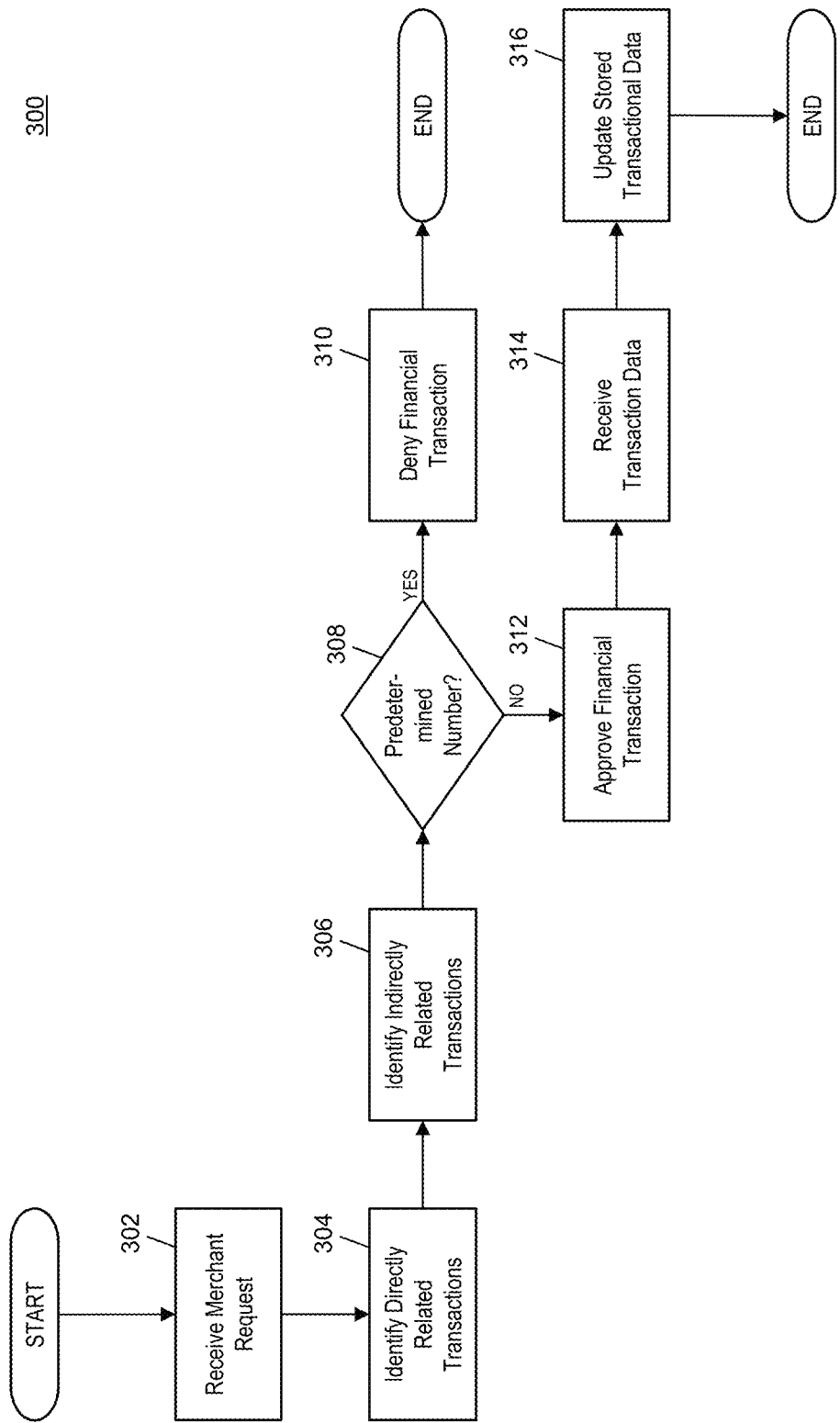
FIG. 3 is a flow diagram illustrating a process for preventing unauthorized repeat purchases by the processing server of FIG. 2 in accordance with exemplary embodiments.

FIG. 3 illustrates an example process 300 executed by the processing server 102 of FIG. 2 for use in the system 100 of FIG. 1 for preventing unauthorized bulk purchasing of a product discounted for first-time or limited purchasers.

In step 302, the receiving device 202 of the processing server 102 may receive an authorization request or other data message from a merchant system 104 for a proposed payment transaction. The authorization request may include at least a merchant identifier, a product identifier, and one or more purchase identifiers. In step 304, the querying module 218 of the processing server 102 may execute a query on the memory 226 of the processing server 102 to identify all purchase data values for past transactions that are directly related to the proposed payment transaction that include one of the one or more purchase identifiers included in the received authorization request. In step 306, the querying module 218 of the processing server 102 may execute one or more additional queries on the memory 226 to identify additional purchase data values that are indirectly related to the proposed payment transaction, which may include a purchase identifier that was not included in the received authorization request, but included in one of the directly related purchase data values.

In step 308, the determination module 220 of the processing server 102 may determine if the number of related, both directly or indirectly, purchase data values meet or exceed a predetermined number of related purchases. The predetermined number may be included in a merchant profile 208 associated with the merchant system 104 as identified using the merchant identifier included in the authorization request. If the number of identified purchase data values meets or exceeds the predetermined number, then, in step 310, the processing server 102 may deny the proposed payment transaction. Denial of the proposed payment transaction may include the generation and transmission, by the transmitting device 224 of the processing server 102, of an authorization response to the merchant system 104 that includes a response code indicating a denial of the payment transaction. In some cases, the authorization response may include the number of related purchase data values. The process 300 may then be completed.

If, in step 308, the number of related purchase data values is below the predetermined number, then, in step 312, the processing server 102 may improve the proposed payment transaction. Approval of the proposed payment transaction may include the generation and transmission, by the transmitting device 224 of the processing server 102, of an authorization response to the merchant system 104 that includes a response code indicating approval of the payment transaction. In some cases, the authorization response may include the number of related purchase data values. The payment transaction may then be processed using traditional methods and systems. In step 314, the receiving device 202 of the processing server 102 may receive transaction data for the payment transaction after successful processing thereof. In step 316, the querying module 218 may execute a query on the memory 226 of the processing server 102 to insert a new purchase data value therein, where the new purchase data value includes the received transaction data, including at least a product identifier and all purchase identifiers included in the received transaction data.

Exemplary Method for Preventing Unauthorized Repeat Purchases of a Product

Figure 4:
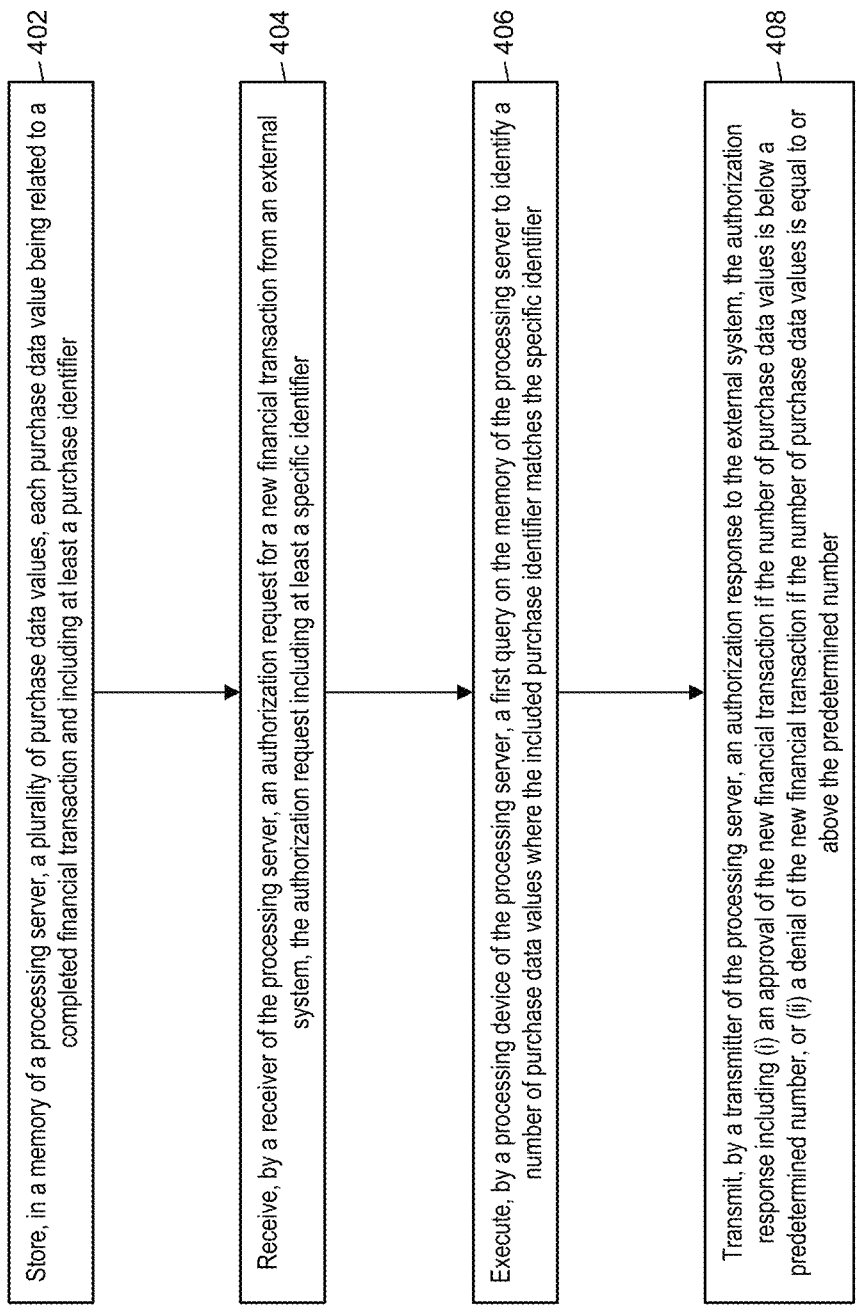
FIG. 4 is a flow chart illustrating an exemplary method for preventing unauthorized repeat purchases of a product in a blockchain network in accordance with exemplary embodiments.

FIG. 4 illustrates a method 400 for the prevention of unauthorized repeat purchases of a product based on past purchases of the product and related purchase identifier values.

In step 402, a plurality of purchase data values may be stored in a memory (e.g., the memory 226) of a processing server (e.g., the processing server 102), each purchase data value being related to a completed financial transaction including at least a purchase identifier. In step 404, an authorization request may be received be a receiver (e.g., the receiving device 202) of the processing server for a new financial transaction from an external system (e.g., a merchant system 104, payment network 108, etc.), where the authorization request includes at least a specific identifier.

In step 406, a first query may be executed on the memory of the processing server by a processing device (e.g., the querying module 218) of the processing server to identify a number of purchase data values where the included purchase identifier matches the specific identifier. In step 408, an authorization response may be transmitted by a transmitter (e.g., the transmitting device 224) of the processing server to the external system, the authorization response including (i) an approval of the new financial transaction if the number of purchase data values is below a predetermined number, or (ii) a denial of the new financial transaction if the number of purchase data values is equal to or above the predetermined number.

In one embodiment, the authorization request may be a first transaction message transmitted via payment rails associated with a payment network (e.g., payment network 108), and the authorization response may be a second transaction message transmitted via the payment rails associated with the payment network. In some embodiments, the authorization request may also include the predetermined number. In one embodiment, the method 400 may include storing, in a merchant database (e.g., the merchant database 206) of the processing server, a merchant profile (e.g., the merchant profile 208) related to a merchant including at least a merchant identifier and the predetermined number, wherein the authorization request further includes the merchant identifier. In some embodiments, the plurality of purchase data values may be included in one or more blocks comprising a blockchain stored in the memory of the processing server.

In one embodiment, each purchase data value may further include at least one additional identification value, the authorization request may further include a specific identification value, and the number of purchase data values identified in the first query executed on the memory of the processing server may further include purchase data values where the at least one additional identification value matches the specific identification value. In a further embodiment, one or more of the purchase data values where the at least one identification value matches the specific identification value may include a second identification value. In an even further embodiment, the method 400 may also include executing, by the processing device of the processing server, a second query on the memory of the processing server to identify a number of additional data values not identified in the first query where the at least one identification value includes the second identification value.

Computer System Architecture

Figure 5:
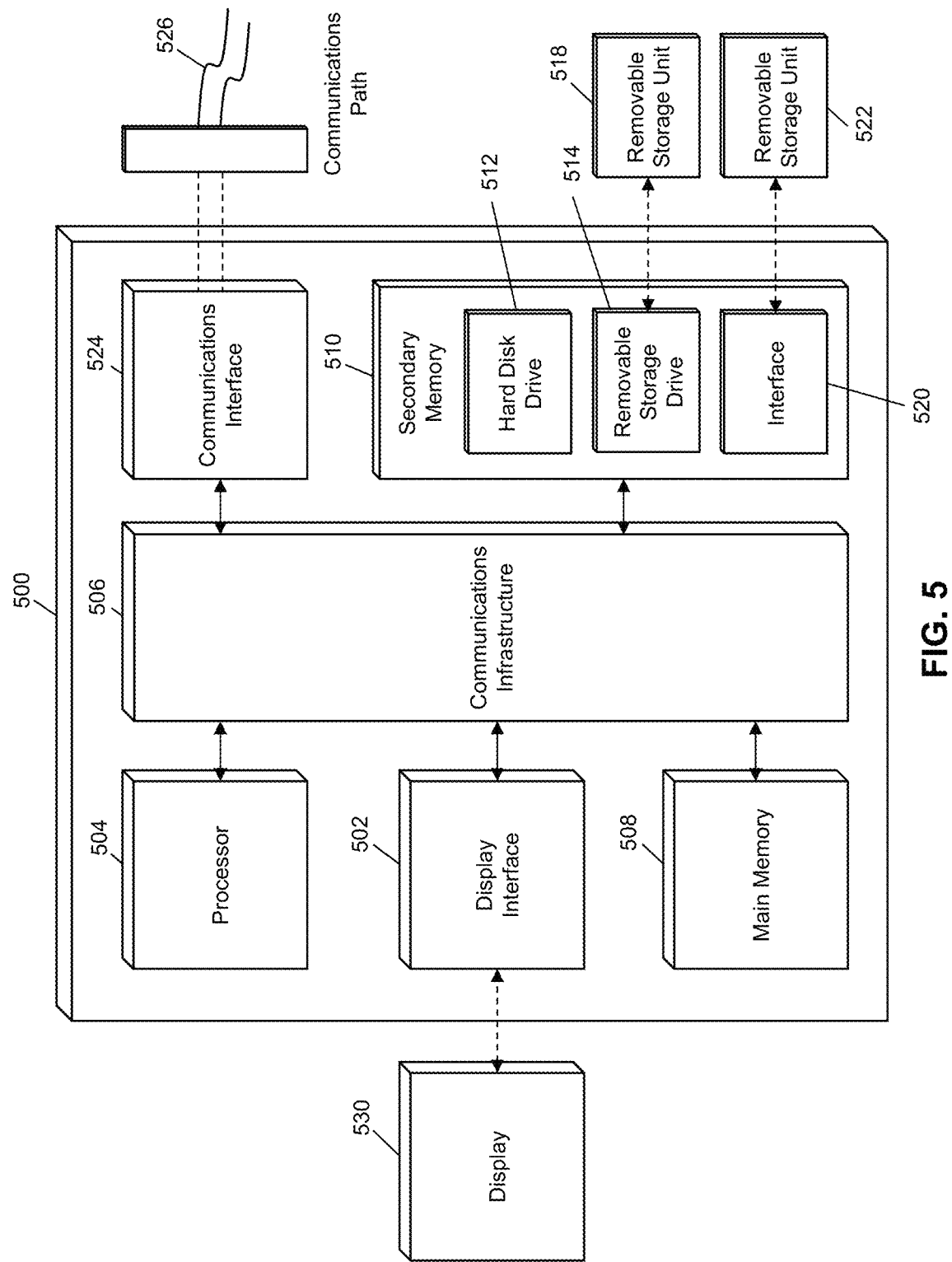
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for preventing unauthorized repeat purchases of a product. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for preventing unauthorized repeat purchases of a product, comprising:
    storing, in a memory of a processing server, a plurality of purchase data values, each purchase data value being related to a completed financial transaction and including at least a purchase identifier;
    receiving, by a receiver of the processing server, an authorization request for a new financial transaction from an external merchant system, the authorization request including at least a specific identifier associated with a purchase of a product;
    executing, by a processing device of the processing server, a first query on the memory of the processing server to identify a number of purchase data values where the purchase identifier included in respective purchase data value matches the specific identifier associated with the purchase of the product received from the external merchant system;
    determining, by the processing device of the processing server, whether the number of purchase data values is (i) below a predetermined number or (ii) equal to or above the predetermined number; and
    transmitting, by a transmitter of the processing server, an authorization response to the external merchant system, the authorization response including (i) an approval of the new financial transaction when the number of purchase data values is determined to be below the predetermined number, or (ii) a denial of the new financial transaction when the number of purchase data values is equal to or above the predetermined number.

2. The method of claim 1, wherein
    the authorization request is a first transaction message transmitted via payment rails associated with a payment network, and
    the authorization response is a second transaction message transmitted via the payment rails associated with the payment network.

3. The method of claim 1, wherein the authorization request also includes the predetermined number.

4. The method of claim 1, further comprising:
    storing, in a merchant database of the processing server, a merchant profile related to a merchant including at least a merchant identifier and the predetermined number, wherein
    the authorization request further includes the merchant identifier.

5. The method of claim 1, wherein the plurality of purchase data values are included in one or more blocks comprising a blockchain stored in the memory of the processing server.

6. The method of claim 1, wherein
    each purchase data value further includes at least one additional identification value,
    the authorization request further includes a specific identification value, and
    the number of purchase data values identified in the first query executed on the memory of the processing server further includes purchase data values where the at least one additional identification value matches the specific identification value.

7. The method of claim 6, wherein one or more of the purchase data values where the at least one identification value matches the specific identification value includes a second identification value.

8. The method of claim 7, further comprising:
    executing, by the processing device of the processing server, a second query on the memory of the processing server to identify a number of additional data values not identified in the first query where the at least one identification value includes the second identification value.

9. A system for preventing unauthorized repeat purchases of a product, comprising:
    a memory of a processing server storing a plurality of purchase data values, each purchase data value being related to a completed financial transaction and including at least a purchase identifier;
    a receiver of the processing server receiving an authorization request for a new financial transaction from an external merchant system, the authorization request including at least a specific identifier associated with a purchase of a product;
    a processing device of the processing server executing a first query on the memory of the processing server to identify a number of purchase data values where the included purchase identifier included in respective purchase data value matches the specific identifier associated with the purchase of the product received from the external merchant system;
    the processing device of the processing server determining whether the number of purchase data values is (i) below a predetermined number or (ii) equal to or above the predetermined number; and
    a transmitter of the processing server transmitting an authorization response to the external merchant system, the authorization response including (i) an approval of the new financial transaction when the number of purchase data values is determined to be below the predetermined number, or (ii) a denial of the new financial transaction when the number of purchase data values is equal to or above the predetermined number.

10. The system of claim 9, wherein
    the authorization request is a first transaction message transmitted via payment rails associated with a payment network, and
    the authorization response is a second transaction message transmitted via the payment rails associated with the payment network.

11. The system of claim 9, wherein the authorization request also includes the predetermined number.

12. The system of claim 9, further comprising:
a merchant database of the processing server storing a merchant profile related to a merchant including at least a merchant identifier and the predetermined number, wherein
the authorization request further includes the merchant identifier.

13. The system of claim 9, wherein the plurality of purchase data values are included in one or more blocks comprising a blockchain stored in the memory of the processing server.

14. The system of claim 9, wherein
each purchase data value further includes at least one additional identification value,
the authorization request further includes a specific identification value, and
the number of purchase data values identified in the first query executed on the memory of the processing server further includes purchase data values where the at least one additional identification value matches the specific identification value.

15. The system of claim 14, wherein one or more of the purchase data values where the at least one identification value matches the specific identification value includes a second identification value.

16. The system of claim 15, the processing device of the processing server further executing a second query on the memory of the processing server to identify a number of additional data values not identified in the first query where the at least one identification value includes the second identification value.

* * * * *